(12) United States Patent
Hollander

(10) Patent No.: US 6,901,089 B1
(45) Date of Patent: May 31, 2005

(54) LASER INSTRUMENT

(76) Inventor: Milton Bernard Hollander, One Arbor Rd., Stamford, CT (US) 06907

( * ) Notice: Subject to any disclaimer, the term of this patent is extended or adjusted under 35 U.S.C. 154(b) by 116 days.

(21) Appl. No.: 10/607,088

(22) Filed: Jun. 26, 2003

Related U.S. Application Data

(60) Division of application No. 09/659,312, filed on Sep. 12, 2000, now Pat. No. 6,614,830, which is a continuation-in-part of application No. 09/605,329, filed on Jun. 27, 2000, now abandoned, which is a continuation-in-part of application No. 09/605,330, filed on Jun. 27, 2000.

(60) Provisional application No. 60/198,384, filed on Apr. 19, 2000, provisional application No. 60/185,385, filed on Feb. 28, 2000, provisional application No. 60/154,591, filed on Sep. 17, 1999, provisional application No. 60/147,021, filed on Aug. 3, 1999, and provisional application No. 60/142,070, filed on Jul. 2, 1999.

(51) Int. Cl.[7] .............................................. H01S 3/10

(52) U.S. Cl. ........................ 372/24; 372/109; 359/618; 374/121

(58) Field of Search .................... 372/109, 9; 359/618, 359/633, 629; 374/121, 130, 141; 356/50

(56) References Cited

U.S. PATENT DOCUMENTS

| | | | | |
|---|---|---|---|---|
| 4,315,150 A | * | 2/1982 | Darringer et al. | 250/338.1 |
| 4,330,212 A | * | 5/1982 | Miller | 356/508 |
| 5,139,331 A | * | 8/1992 | Gentile | 356/218 |
| 5,368,392 A | * | 11/1994 | Hollander et al. | 374/121 |
| 5,524,984 A | * | 6/1996 | Hollander et al. | 374/121 |
| 5,727,880 A | * | 3/1998 | Hollander et al. | 374/121 |
| 6,659,639 B2 | * | 12/2003 | Hollander et al. | 374/121 |

* cited by examiner

Primary Examiner—Minsun Oh Harvey
Assistant Examiner—Tuan N. Nugyen
(74) Attorney, Agent, or Firm—William A. Drucker

(57) ABSTRACT

The invention relates to instruments which include radiometers and which generate a laser beam for striking a target at a distance to assist in aiming the instrument at a selected area of a target. Provision is made for splitting a single beam, used for instance for centering the instrument on the target, into a plurality of beams for creating a pattern or for defining an area on the target. When a single beam is split, the resultant plural beams produced are of relatively lower power, which may be insufficient for visibility on a target at a distance. The invention provides apparatus to increase the power of the single laser beam when it is split, so as to provide plural beams of appropriately higher power and visibility.

10 Claims, 2 Drawing Sheets

LASER INSTRUMENT

This application is a division of application Ser. No. 09/659,312 filed Sep. 12, 2000, now U.S. Pat. No. 6,614,830 which is a continuation-in-part of U.S. patent applications:

Ser. No. 09/605,329 filed Jun. 27, 2000, now abandoned which claims priority based upon Application No. 60/142070 filed Jul. 2, 1999 and
Application No. 60/147021 filed Aug. 3, 1999 and
Application No. 60/154591 filed Sep. 17, 1999 and
Application No. 60/185385 filed Feb. 28, 2000 and
Application No. 60/198384 filed Apr. 19, 2000

Ser. No. 09/605,330 filed Jun. 27, 2000, which claims priority based upon

Application No. 60/142070 filed Jul. 2, 1999 and
Application No. 60/147021 filed Aug. 3, 1999 and
Application No. 60/154591 filed Sep. 17, 1999 and
Application No. 60/185385 filed Feb. 28, 2000 and
Application No. 60/198384 filed Apr. 19, 2000

This application claims priority from:

Ser. No. 60/154,591 filed Sep. 17, 1999
Ser. No. 60/185385 filed Feb. 28, 2000
Ser. No. 60/187400 filed Mar. 7, 2000
Ser. No. 60/198384 filed Apr. 19, 2000
Ser. No. 09/650,330 filed Jun. 27, 2000

FIELD OF THE INVENTION

The present invention relates generally to the projection of laser beams for the directional aiming of apparatus such as radiometer instruments, which may be used for ascertaining the temperature of a surface using infra-red measurement techniques, and more particularly to such apparatus which utilises a laser sighting device arranged to project one or more laser sighting beams onto a target for identifying on the surface of the target an energy zone thereof, the temperature of which is to be measured.

It is useful, in the operation of such laser beam projection apparatus, to have the facility to change the number and/or configuration of beams which are issued from the laser beam projector.

By way of example, in a first case it may be desirable to have a single beam which is axial and which gives rise to a single central illuminated spot on the target area to be investigated. In a second case it may be desirable to have a plurality of laser beams which produce illuminated spots on, for example, the periphery of a target area of a surface to be investigated. The selected production of a single spot, by a single laser beam, and of a plurality of spots by a plurality of laser beams, is conveniently arranged by providing a beam splitter, which may be for example a diffraction lens or grid, which can be brought into and out of operation with respect to a single laser beam produced by the beam generator. When a single laser beam is divided, by the beam splitter, into a plurality of beams, there is a corresponding proportional lowering of the strength of each of the plurality of beams, as compared with that of the single central beam.

According to the degree of sub-division of the single beam, the strength of each of the plurality of beams may then become to low to be of practical use, i.e. the illumination provided by each of them on the surface of the target may be too weak to see clearly, especially in bright ambient light, or at a relatively long distance which may be essential in the investigation of a target surface which is at a very high temperature.

It is not possible to overcome this factor of change of intensity, as between the single beam and the plurality of beams by merely increasing proportionately the power of the single beam when it is to be subdivided, because there are legal and practical restrictions on the use of laser beams because of the possible danger to the user, e.g. the damaging of eyesight. A requirement currently in force for a Class IIIA Laser Diode is that the maximum output be less than 5 milliwatts. It is known in practice in the art to utilise hand-held instruments, such as radiometers, which incorporate a laser beam generator for aiming a beam, or beams, at a target area, and a heat-sensitive device for measuring the radiation which is emitted by the targeted area of a heated surface. Unless provision can be made for changing of the strength of the laser beam, there is always a limitation of (a) the number of beams which can usefully be obtained from splitting of a single beam, and (b) the effectiveness of the instrument, used with a distant target, because of the resultant relatively lowered illuminating power of each of the beams which is split from the original single beam.

OBJECTS OF THE INVENTION

It is a first object of the invention to provide an improvement, to laser beam projection instruments having provision for projecting a single, e.g. axial, beam and for dividing that single beam into a plurality of beam, by which the relative power of the single beam, and of the plurality of beam, can be varied so that the power of the multiple beams can be increased while still remaining within acceptable limits.

It is a second object of the invention to provide an improvement, in laser beam projection instruments, whereby the power of the single beam is variable at its stage of generation such that its power may be at an acceptable level while the single beam is being used, and may be increased when a plurality of beams are produced, to enhance the utility of the instrument at a distance from a target, while nevertheless keeping the power of the plural beams at acceptable level.

It is a third object of the invention to provide an improvement, in laser beam projection instruments, whereby the power of the single beam is made initially substantially higher than would be safe if used alone so as, when it is sub-divided into a plurality of beams, to permit that plurality of beams each to have a usefully enhanced power, and whereby the power of the single beam is reduced. by attenuation, when used as a single beam, so as to remain within acceptable limits.

BRIEF DESCRIPTION OF THE DRAWINGS

The foregoing and still other objects and advantages of the present invention will be apparent from the detailed explanation of the preferred embodiments of the invention in connection with the accompanying drawings, wherein.

DESCRIPTION OF THE PREFERRED EMBODIMENTS

Figure 1:
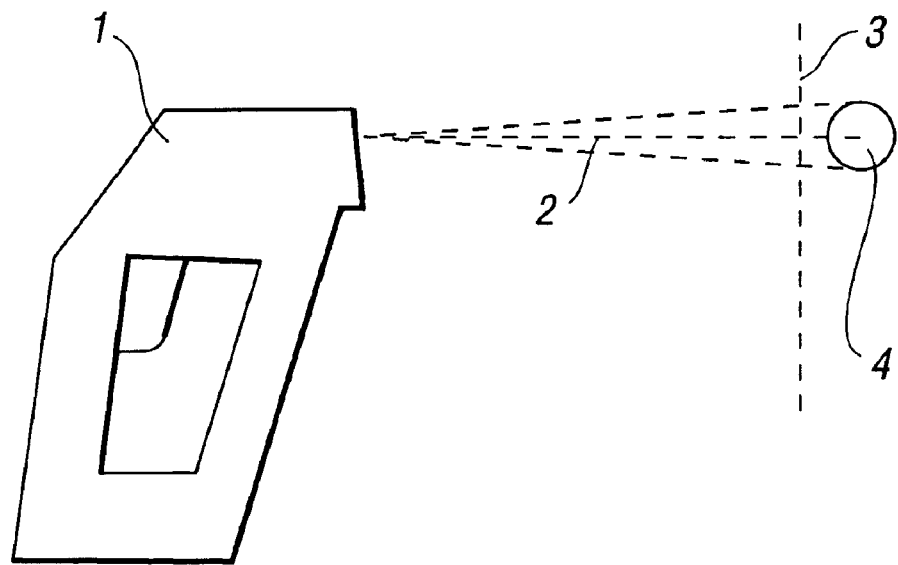
FIG. 1 is a side elevation of a representative pistol-type radiometer instrument shown in its condition of operation in which a single axial laser beam is produced.

Referring to FIG. 1 of the drawings there is shown a radiometer instrument 1 incorporating a laser beam production means which produced a single axial laser beam 2 which is directed at a target 3 and produces on the target an illuminated spot 4.

Figure 2:
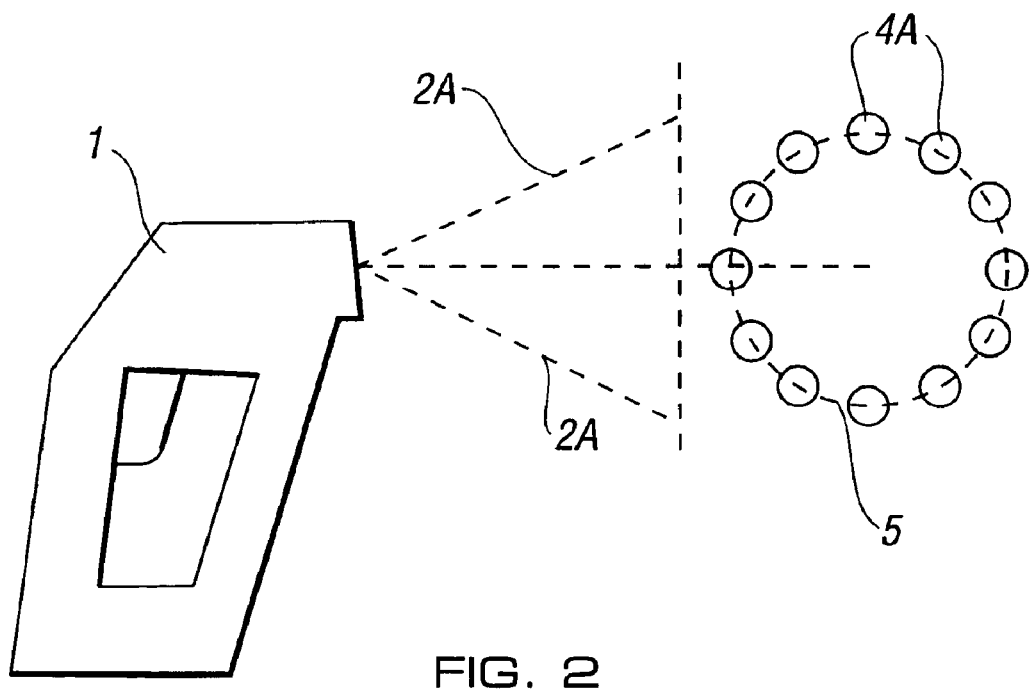
FIG. 2 is a side elevation of the radiometer instrument shown in its condition of operation in which the single laser beam has been divided into a plurality of beam.

Referring to FIG. 2 of the drawings there is shown the same radiometer instrument in an alternative manner of operation in which it produces a plurality of beams 2A which produce on the target a plurality of spots 4A arranged in a circle of define an area 5.

Figure 3:
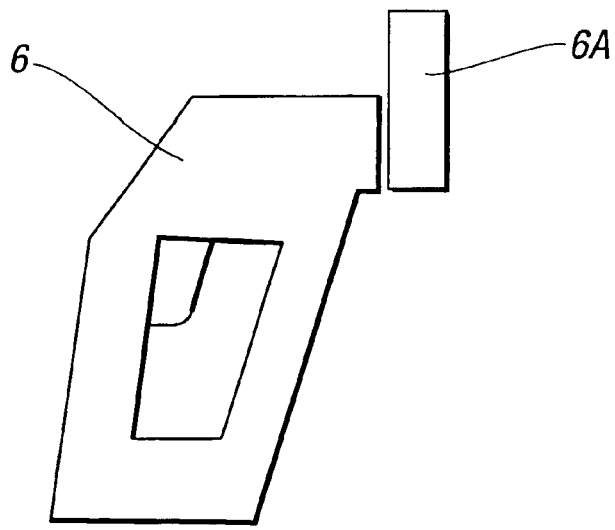
FIG. 3 is a side elevation of the radiometer instrument shown with a demountable attachment at its front end serving for optional production of multiple beams from a normally single beam device.
Figures 4, 5:
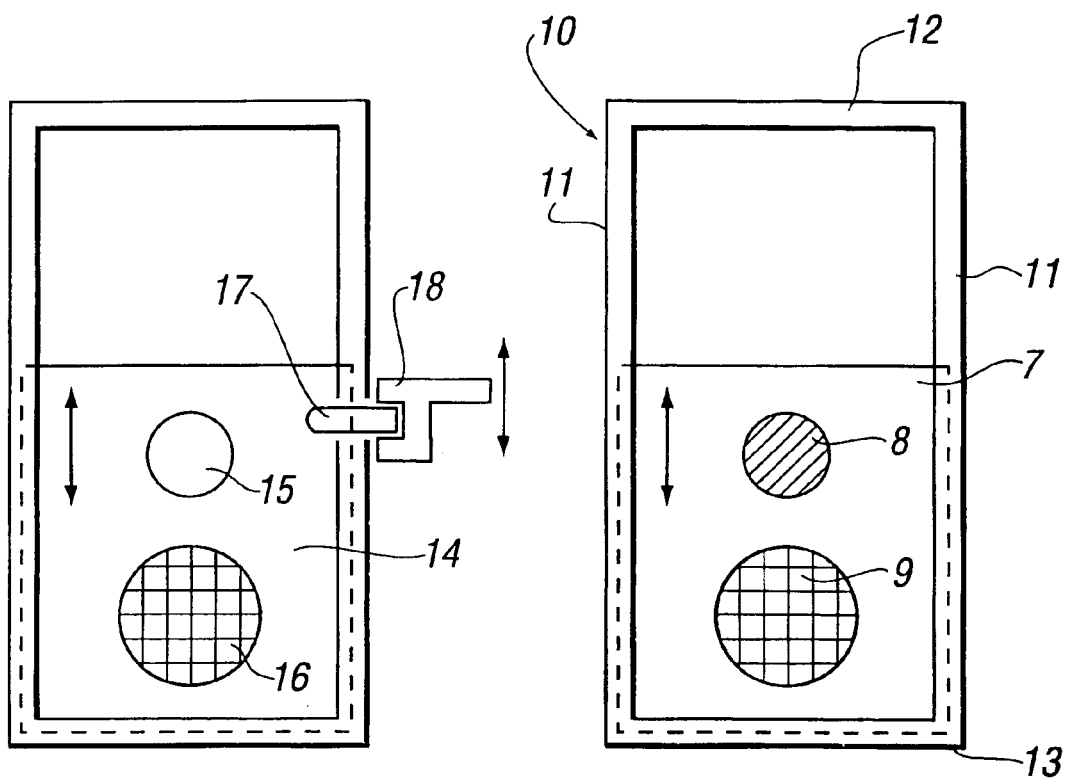
FIG. 4 is an elevation, to an enlarged scale, of a first form of attachment for the radiometer.
FIG. 5 is an elevation, to an enlarged scale, of a second form of attachment for the radiometer.

Referring to FIG. 3 of the drawings there is shown a further embodiment 6 of radiometer instrument which has at its front end a demountable attachment 6A which is adjustable, in the manner described below with reference to FIGS. 4 and 5, to produce selectively a single axial laser beam and a plurality of spaced laser beams for defining an area of a target;

Referring to FIG. 4 of the drawings, the attachment in a preferred embodiment of the best known mode incorporates a slide 7 which has in it a first opening 8 containing an attenuator device, and a second opening 9 containing a beam splitter lens. When the slide is in its lowermost position, on the front of the instrument, the attenuator in opening 8 is presented in front of the laser beam source and reduces the strength of the single axial laser beam produced. When the slide is in its uppermost position, the beam splitter in opening 9 is presented in front of the laser beam source, and a plurality of beams (2A in FIG. 2) are produced. To retain the slide in position on the instrument, there is provided a slideway 10, for mounting on the radiometer instrument, having undercut lateral arms 11, 11 in which the slide can move vertically, and upper and lower stops 12 and 13 limiting the up and down movement of the slide.

Referring to FIG. 5 of the drawings, a slide 14 for mounting on the front of the instrument has a plain opening 15 at its upper part, and a beam splitter lens 16 at its lower part. The slide 14 is movable vertically within limits, in a slideway, similar to that shown in FIG. 4 for mounting on the radiometer instrument. On one side of the slide 14 there is mounted a lug 17 which is positioned to engage with a switch arm 18 on the instrument. The switch is incorporated in the power circuitry of the laser in the radiometer 6 (FIG. 3) and according to the raised or lowered position of the switch arm 18, as the case may, the laser is operated at full power or lowered power. When the slide 14 is in lowered position, and the plain hole opening 15 is presented in front of the laser generator, the power of the laser is at a reduced scale which is safe and acceptable in use. When the slide 14 is in raised position, and the beam splitter is presented in front of the laser generator of the radiometer 6, the power of the laser is at an increased scale so that the plurality of beams produced by the splitter can each have adequate increased power for acceptable visibility on the target.

The attachment may serve as an "add on" item which can be used for upgrading of existing laser radiometers and like instruments in which a wide differentiation between the power of the single beam, and of the plurality of beams, would otherwise be detrimental. Some existing radiometers may incorporate means to vary the laser brightness, but with the present invention there is the assurance that the brightness will be automatically maintained at a preferred level within safety limits.

In an apparatus where a single centering beam is then switched to become twelve area-defining beams, the change of intensity of each area-defining beam could be upgraded by a factor of twelve. A similar degree of down-grading of power would occur when the area-defining beams are switched back to provide a single centering beam. Thus, although the power utilised at the target in providing the area defining beams is perhaps twelve times that permitted for a single beam, there is nevertheless no risk of exposure to a higher power factor.

Another way in which the power used in each beam, and particularly in the greater number of beams, can vary is to pulse the laser so as to have periods of being "on" and "off", or of lower average power and higher average power, alternately, with the result that a higher power laser can be used in a unit having average optical power output.

Change of the power utilised, from and into the respective factor, is obtained in a further embodiment of the invention by the use of attenuator means. By way of example such an attenuator, in one embodiment, is a member which is movable, say by sliding or twisting, by the operator or by a mechanism controlled by the operator or set to operated automatically so as to present different configurations such as patterns, or obscured or non-obscured areas, or areas having varied degrees of attenuation, in the path of the or each beam.

In another embodiment, the attenuator, such as an adjustable iris, is arranged to vary the focus and brightness of an optical device through which the beam or beams is or are passed. In an embodiment the attenuator is linked to the beam-changing means so that when the number of subsidiary beams is increased, which would otherwise reduce their individual power proportionately, the power of the main beam, or beams, is increased proportionately. This may result in the original output power of the main beam or beams being greater than the safety limits mentioned above but the visible output of the apparatus at the target can still remain within the safety limits. In a further embodiment, such an attenuator is incorporated in, for example, a movable member such as a turret or slide linked to a manual change-over control of the apparatus, or actuated automatically and sequenced in synchronism with the sequenced changing over of the single beam to multiple beam operation. The laser light, in another embodiment, is passed through a shutter mechanism which is automatic or manual.

In further embodiments of the invention, the attenuator is a beam splitting system which permits only a portion of a beam to be transmitted, or else is a beam-strength-reducing arrangement such as a partially opaque screen, or an opaque disk centered in the beam.

It is a property of the combination of the human eye and brain that there is retention of a latent image for a short period of time, with the result that for example an illumination which is being pulsed "on" and "off" in sufficiently rapid succession, as in a movie film, may appear to the observer to be a constant illumination. This permits, in accordance with a further embodiment of the invention, the use of a single aiming beam, or a small group of aiming beams, and also permits a number of area defining beams to be used in a pulsed manner at a rate greater than the memory of the combination of eye and brain, whilst nevertheless giving to the observer an impression of continuous illumination of the target. In particular, where a plurality of separate beams are disposed along a circle or other area-defining figure, in accordance with a further embodiment of the invention they are caused to move step-by-step, or in continuous motion, along the area-defining figure, e.g. the perimeter thereof, whilst being pulsed simultaneously or sequentially "on" and "off" at a rate, so that to the observer the area-defining figure remains constantly illuminated, as a result of the latent image effect. In this embodiment of the invention, for example, a laser of higher power that is otherwise used in a single continuous, i.e. non-interrupted, beam can be pulsed so as to produce a plurality of beams, e.g. twelve beams each having a pulsing rate for one-twelfth the time of a continuous beam. The viewer's eye retention will, in effect, cause the circle to appear as twelve brighter illuminated spots.

In accordance with further embodiments of the invention, the movement of the plurality of beams is obtained automatically, electronically or mechanically, or by manual actuation by the user of the apparatus, and the pulsing simultaneously and/or sequentially "on" and "off", i.e. the variation of strength, is obtained by variation of power used to generate the beam, or by variation of the proportion of the beam utilised, for example by beam-splitting mechanism such as a multiple-mirror system, or a masking device with areas of different masking capability.

In a further embodiment of the invention, the beam splitter is arranged to provide laser beam spots not only at the periphery of the target area, but also within the target area, including at the center thereof. In a still further embodiment, the beam splitter is arranged to provide dots, or other illuminated areas, in shapes other than a circle, and for example in the form of a cross.

In accordance with still further improvements of the invention, means provided for the front end of a laser beam generating instrument, for example on a pyrometer, for varying the nature of the beam emitted, are made as an attachment in the form of a separate entity which is mounted removably on the instrument, so as for example to be attachable and detachable, for example utilising a self-tapping thread, as and when desired, and so that attachments with different beam-varying properties may be utilised as required. The attachments may conveniently have relatively movable portions, for example in the form of a slideway, for mounting on the instrument, and a slide movable in the slideway into respective positions in which different forms or degrees of modification of the laser beam are obtained. By way of example, such a movable portion may have positions in which it presents respectively a simple opening or a beam splitter in the path of the laser beam, or again in which it presents a beam attenuator and a beam splitter in the path of the beam. In a further feature, the movable portion of the attachment may serve to actuate switching means, on the instrument, arranged to vary the strength of the laser beam appropriately.

In a further embodiment, the attachment provides selective production of, for example, a single central beam of relatively higher power, for aiming at a target to permit accurate sighting on a selected area of the target, combined with a plurality of other or split beams directed at the target for outlining an area thereof, or for producing a pattern of spots on the target. In a further form, the plurality of beams may be shifted from time to time, say in a circle, so as more clearly to outline a selected area of the target. In yet another form, the attachment provides projection of split beams which strike the target as a closed loop figure, such as a circle. In yet another arrangement, the attachment is constructed to divert a single laser beam to strike successive plural points on a target so as effectively to outline an area thereof, and preferably with a rapidity sufficient to result in persistence of vision giving the impression of a full continuous illumination of the line of successive points.

I claim:

1. In a hand held measurement instrument comprising a radiometer heat detector having a field of view and a laser aiming system all mounted on a common support:

the improvement comprising the combination of a first laser, directing multiple diffracted laser beams to the edges of said field of view; and a second laser, directing a laser beam to the center of said field of view; and a switch selecting between separate and simultaneous operation of said lasers.

2. An instrument according to claim 1 including means to modify the brightness of said second laser.

3. An instrument according to claim 2 in which said second laser is a Class 2 laser.

4. An instrument according to claim 1 in which the first laster is a Class 3 laser.

5. An instrument according to claim 1 in which the laser light spots from the first laser are collectively less than one milliwatt in brightness.

6. An instrument according to claim 1 in which the first laser is attenuated in brightness so that the beams are collectively less than one milliwatt.

7. An instrument according to claim 1 in which the apparent brightness of at least one laser is modified.

8. An instrument according to claim 7, in which brightness is modified by optical attenuation.

9. An instrument according to claim 7 in which brightness is modified by laser pulsation.

10. An instrument according to claim 8 in which brightness is modified by diffraction.

* * * * *